(No Model.)
G. W. HORNE.
FEED BAG ATTACHMENT.
No. 273,842. Patented Mar. 13, 1883.
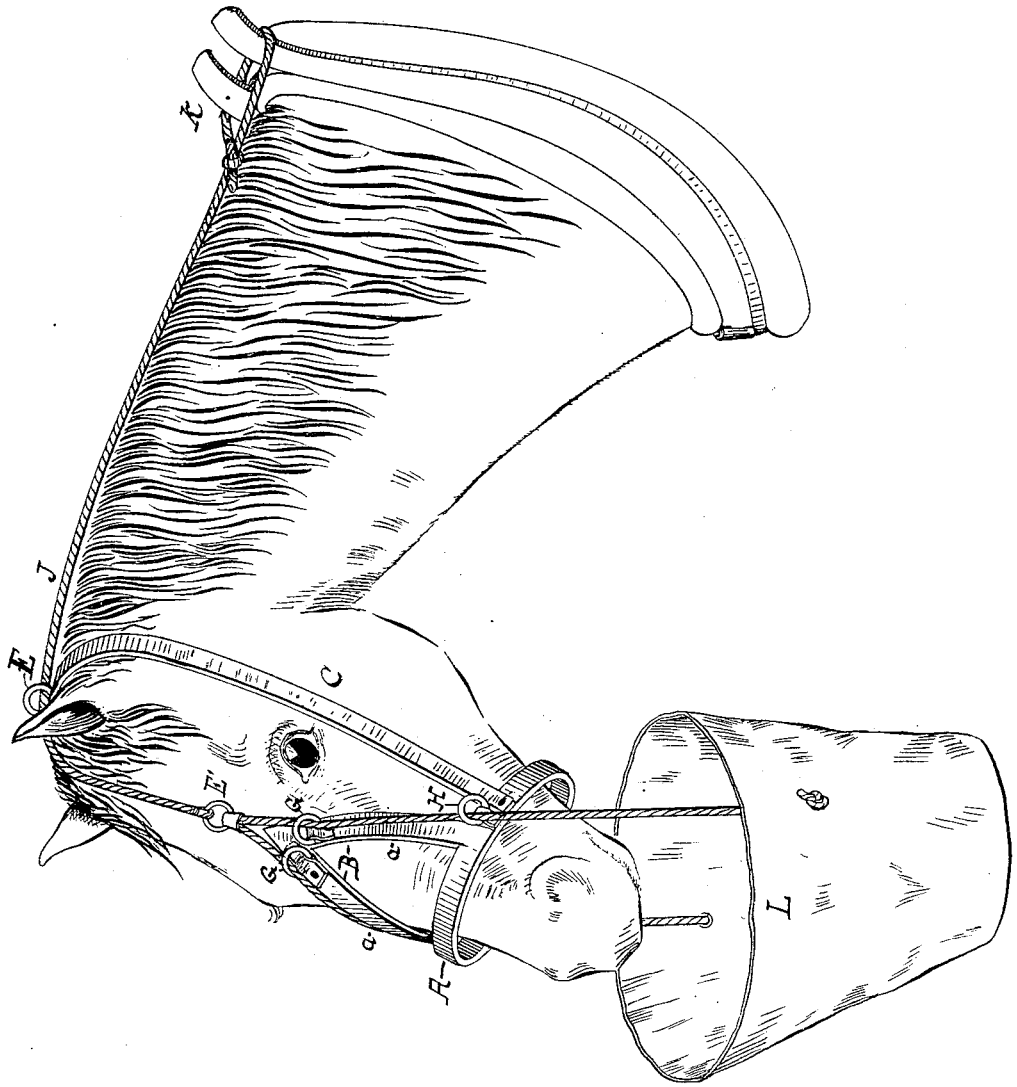
ATTEST:
J. A. Murdle
C. N. Crawford
INVENTOR:
George W. Horne
by
Francis C. Bowen
Attorney.

UNITED STATES PATENT OFFICE.

GEORGE W. HORNE, OF NEW YORK, N. Y., ASSIGNOR TO ERNEST ROCHAT, OF SAME PLACE.

FEED-BAG ATTACHMENT.

SPECIFICATION forming part of Letters Patent No. 273,842, dated March 13, 1883.

Application filed August 7, 1882. (No model.)

*To all whom it may concern:*

Be it known that I, GEORGE W. HORNE, a subject of Great Britain, residing at New York city, in the county of New York and State of New York, have invented certain new and useful Improvements in Feed-Bag Attachments, of which the following is a specification, reference being had therein to the accompanying drawing.

My invention relates to feed-bags, such as are commonly known as "nose-bags," and are applied to a horse's head in such a manner as to enable the animal to reach the contents.

The invention consists in a novel construction, arrangement, and combination, with a bag, of a frame-work or series of straps to be applied to the animal's nose, a series of guiding-rings carried by said frame-work, and a rope or strap passing through said guiding-rings and having its front ends attached to the bag and its rear end attached to the hames, whereby provision is made for allowing the animal to reach the contents of the bag by the act of lowering the head, and for bringing the nose clear of the bag by the act of raising the head, as hereinafter more particularly described.

The accompanying drawing represents a perspective view of my invention, and shows the manner of applying it.

The frame-work or series of straps consists of a band, A, a nose-piece, B, and a cheek-piece, C. The band A passes around the nose of the animal. The nose-piece is of inverted-V shape, and has its ends attached to the band A, near the sides of the mouth of the animal, forming, with the band, a triangle having its apex between the eyes; and the cheek-piece consists of a strap passing over the top of the head, behind the ears, and having the ends attached to the band A, near the ends of the nose-piece. To this strap C, at the top of the horse's head, is attached a ring, E. To the nose-piece B, near the apex, are attached two rings, G, and to the band A, near the points of attachment of the nose-piece and cheek-piece, on both sides of the mouth, are two rings, H. A single strap, rope, or cord, J, has one end attached to the projecting upper end of the hames K, and the other end is passed through the guide-ring E and secured to the ring E'. The branches *a a*, also fastened to the ring E', are passed through the rings G of the nose-piece, and thence through the rings H of the band, so as to bring the branches to the sides of the mouth, after which the ends are attached to the bag L in the usual or any suitable manner. If desired, the strap or rope J may be of one piece until it passes through the guide-ring E, below which it is divided and passed through the rings G and H, and its ends secured to the bag in any suitable manner.

The apparatus being applied to the animal in the manner represented in the drawing, in order to reach the contents of the bag the animal has only to lower his head, which will place his nose and the bag in such relation to each other as to enable him to secure a mouthful, after which, on raising his head, his nose is brought clear of the bag, so as to enable him to breathe freely while masticating the food.

Any description of bag may be employed. The bag never touches the ground, and there is less wear and tear in consequence. There is no waste of feed, as the bag is always under the mouth. By the arrangement of the single cord, strap, or rope the bag is always hanging level, and will not be tilted or canted by the horse, or turning his head from side to side, as is the case with the ordinary double cord, where one line slackens and the other line tightens. By passing the cord J through the guide-ring E on the poll of the horse the greatest amount of leverage is obtained, which is not the case when the rings are fastened to the cheeks of the horse.

What I claim as new, and desire to secure by Letters Patent, is—

A feed-bag attachment consisting of a frame-work or series of straps, A B C, a series of rings, E G H, and a strap, rope, or cord, J, arranged and operating substantially as and for the purpose herein described.

In testimony whereof I affix my signature in presence of two witnesses.

GEORGE W. HORNE.

Witnesses:
FRANCIS CLARE BOWEN,
MOORE VAN ZANDT.